United States Patent
Kirkpatrick et al.

(10) Patent No.: US 6,691,138 B1
(45) Date of Patent: Feb. 10, 2004

(54) FLEXIBLE CONFIGURATION FILE MANAGER

(75) Inventors: Mark Kirkpatrick, Conyers, GA (US); Darin Morrow, Acworth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 390 days.

(21) Appl. No.: 09/598,706

(22) Filed: Jun. 21, 2000

(51) Int. Cl.$^7$ .............................................. G06F 17/30
(52) U.S. Cl. ...................................... 707/204; 345/777
(58) Field of Search ................................ 707/204, 205; 345/777, 781, 783; 713/1, 2, 100

(56) References Cited

U.S. PATENT DOCUMENTS

| | | | | |
|---|---|---|---|---|
| 5,163,130 A | * | 11/1992 | Hullot | 345/763 |
| 5,247,683 A | * | 9/1993 | Holmes et al. | 709/221 |
| 5,740,431 A | * | 4/1998 | Rail | 707/100 |
| 5,999,180 A | * | 12/1999 | Coskrey, IV | 345/810 |
| 6,061,693 A | * | 5/2000 | Carney et al. | 707/1 |
| 6,430,609 B1 | * | 8/2002 | Dewhurst et al. | 709/220 |
| 6,493,751 B1 | * | 12/2002 | Tate et al. | 709/221 |

OTHER PUBLICATIONS

Greg Perry, "Sam' Teach Yourself Windows 95 in 24 hours", Sams Publishing, Second Edition, pp. 50–53, 107–108, 141–143, 147–149, 190–191, 194–195; 340–343, 438–439.*

* cited by examiner

Primary Examiner—Safet Metjahic
Assistant Examiner—Nguyen CamLinh
(74) Attorney, Agent, or Firm—Shaw Pittman LLP (57) ABSTRACT

A configuration file manager provides a graphical user interface for facilitating management of configuration file parameters. Configuration parameters from multiple files can be managed simultaneously. Configuration parameters can be modified, deleted, added, searched and sorted. Comments can be placed in association with particular configuration parameters that provide any information about the parameter including, its history, purpose and dependency on other configuration parameters.

55 Claims, 5 Drawing Sheets

FLEXIBLE CONFIGURATION FILE MANAGER

BACKGROUND

1. Field of Invention

The present invention relates generally to the field of computer application development. More specifically the present invention is related to the field of managing configuration files and configuration parameter-value pairs stored therein.

2. Background of the Invention

Configuration files store configuration parameters and their corresponding values as configuration parameter-value pairs (also referred to herein as parameter-value pairs). These parameter-value pairs are generally used to initialize computer applications. The configuration parameters include such things as timing parameters for network gateway applications, status indicators, variable initializations, constant values and the like. In typical applications there can be many configuration files, each having hundreds or even thousands of configuration parameters. For example, there might be a configuration file for every process or application executing on a given computer system. Consequently, managing the configuration parameters can be an enormous task. For example, finding a particular parameter or the file in which it is located can be extremely difficult. The purpose of particular parameters can be lost with time or personnel changes.

Another problem concerns modifying configuration parameters. It is often the case that modifying one configuration parameter will have an effect on other configuration parameters. That is, there is an interdependency between configuration parameters. This interdependency can cross configuration file boundaries. Thus, a change to a configuration parameter in one configuration file can affect a configuration parameter in another configuration file. This interdependency information is not generally available in conventional systems. Where it is available, the form is generally not convenient for the user. For example, the user may have to access a data dictionary stored as a hard copy.

Conventional systems do exist that will read a configuration file and present it to a user for editing. However, such systems are severely limited because only the configuration parameters in the configuration file can be modified. These systems do not permit the addition of new configuration parameters, the deletion of existing configuration parameters, sorting configuration parameters, or searching configuration parameters. Thus, conventional editors such as Unix's vi editor and Microsoft WORD must be used for more comprehensive editing of configuration files. However, conventional editors are unwieldy when it comes to editing configuration files, because there is no management of the configuration parameters. This is especially important because, as described above, changes to one parameter can affect other parameters in ways that might not be obvious.

SUMMARY OF THE INVENTION

The present invention provides a user interface for managing configuration files in a computer system. The configuration files to be managed can be selected in a first window. The selected configuration files are presented in a configuration file management window. A configuration file is selected and the parameter-value pairs contained therein are displayed in the configuration file management window. Using a number of management buttons, the configuration parameters can be changed, for example, modified, added and deleted. Parameter values can be changed. Sorting of the parameter-value pairs by various criteria can be performed.

Comments regarding the parameter-value pairs can be provided. The comment can be any desired information for the parameter-value pair, including for example, permissible range of the parameter, tips on the using the parameter and dependencies on other parameters.

In one embodiment, the present invention is a system for managing a plurality of configuration parameters stored in a plurality of configuration file. The system includes a computer having disk on which the plurality of configuration parameters is stored in the plurality of configuration files. The computer is coupled to a display device. A configuration file management window is displayed on the display device. The configuration file management window include a configuration file window that displays at least a subset of the plurality of configuration files along with the configuration parameters and associated values stored as configuration parameter-value pairs in the each of the configuration files in the subset.

Another embodiment of the present invention is a method for managing a plurality of configuration parameters stored on a computer disk coupled to a computer in a plurality of configuration files having a plurality of configuration parameter-value pairs stored therein. The method includes the steps of selecting a subset of the plurality of configuration files for display on a display device coupled to the computer, and displaying the subset of the plurality of configuration files and the configuration parameters and associated values stored in a configuration management window with selectable tabs.

Thus, one object of the present invention is to facilitate management of configuration parameters in configuration files.

Another object of the present invention is to provide a user interface for managing configuration files.

Yet another object of the present invention is to manage multiple configurations files in multiple directories.

Yet another object of the present invention is to provide tools for manipulating configuration parameter-value pairs.

Yet another object of the present invention is to facilitate informing users of interdependencies between configuration parameters.

These and other objects of the present invention are described in greater detail in the detailed description of the invention, the appended drawings and the attached claims.

DETAILED DESCRIPTION OF THE PREFERRED EMBODIMENTS

Figure 1:
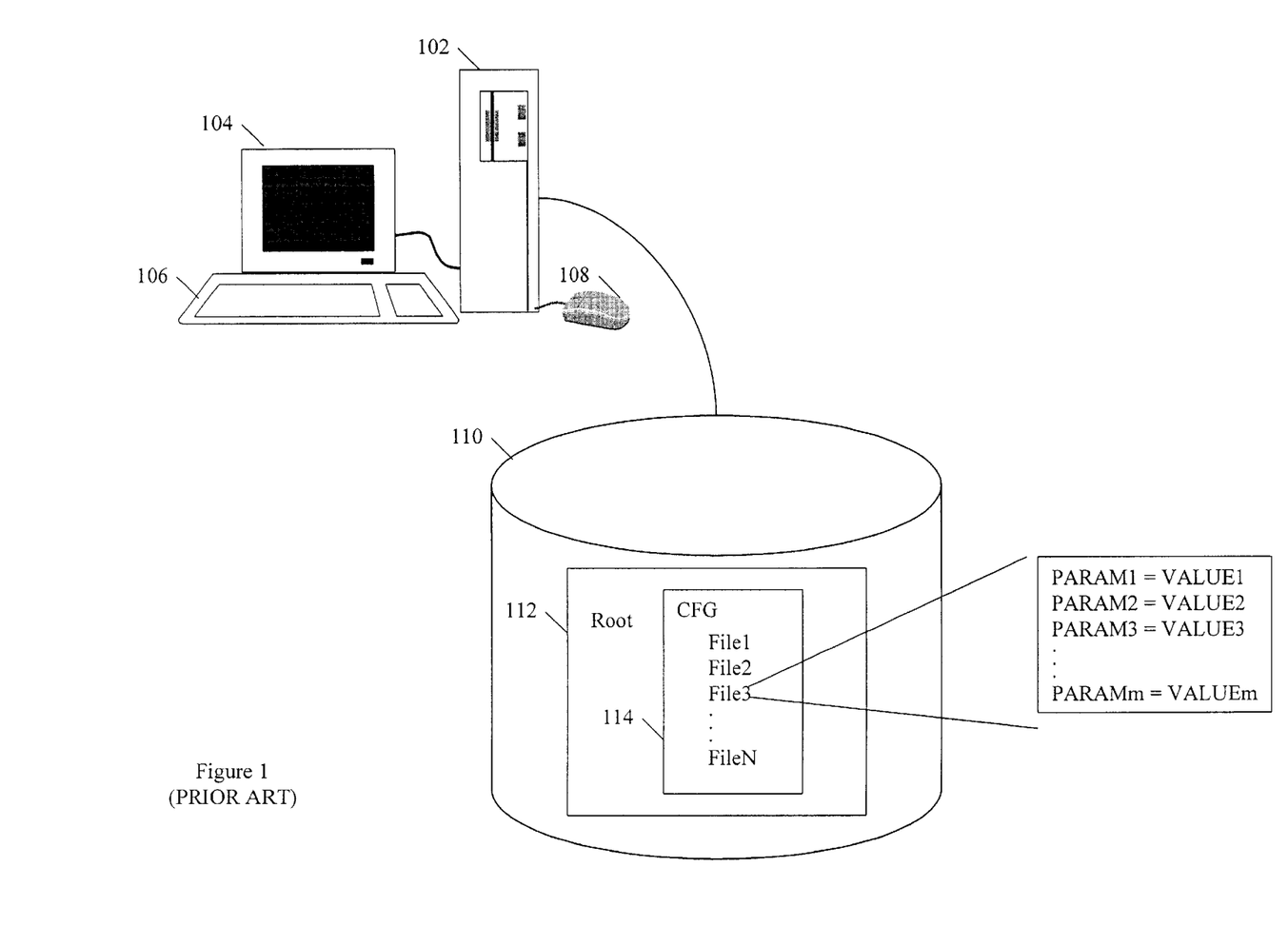
FIG. 1 is a schematic diagram of a conventional system using configuration files.

FIG. 1 is a schematic diagram of a conventional computer architecture. A computer 102 has a display device 104 and one or more input devices, such as keyboard 106 and pointing device 108. Preferably pointing device 108 is a well known mouse or trackball. A mass storage device, such as disk 110, is connected to the computer. As is well known, files are stored on mass storage device 110 in a hierarchical structure of directories and subdirectories. The top directory is generally called the root directory. Generally, files having some degree of commonality are stored together in the same directory or subdirectory. In the example shown in FIG. 110, a root directory 112 contains a configuration file subdirectory (CFG)114 containing N configuration files, File1, File2, . . . FileN. As an example of the contents of the configuration files, File3 is shown as having M configuration parameters and corresponding values. The parameters and corresponding value are referred to herein in the alternative as parameter-value pairs. Management of the configuration files and the parameter-value pairs stored therein becomes increasingly difficult as N and M increase.

The present invention provides a user interface to the configuration files that eliminates much of the time and frustration involved with managing configuration files and parameters. Configuration files to be managed are selected and displayed. Configuration parameters and corresponding values are manipulated as desired using the interface. It would be apparent to those having skill in the art how to program a computer to generate the user interface of the present invention in light of the disclosure provided herein.

Figure 2:
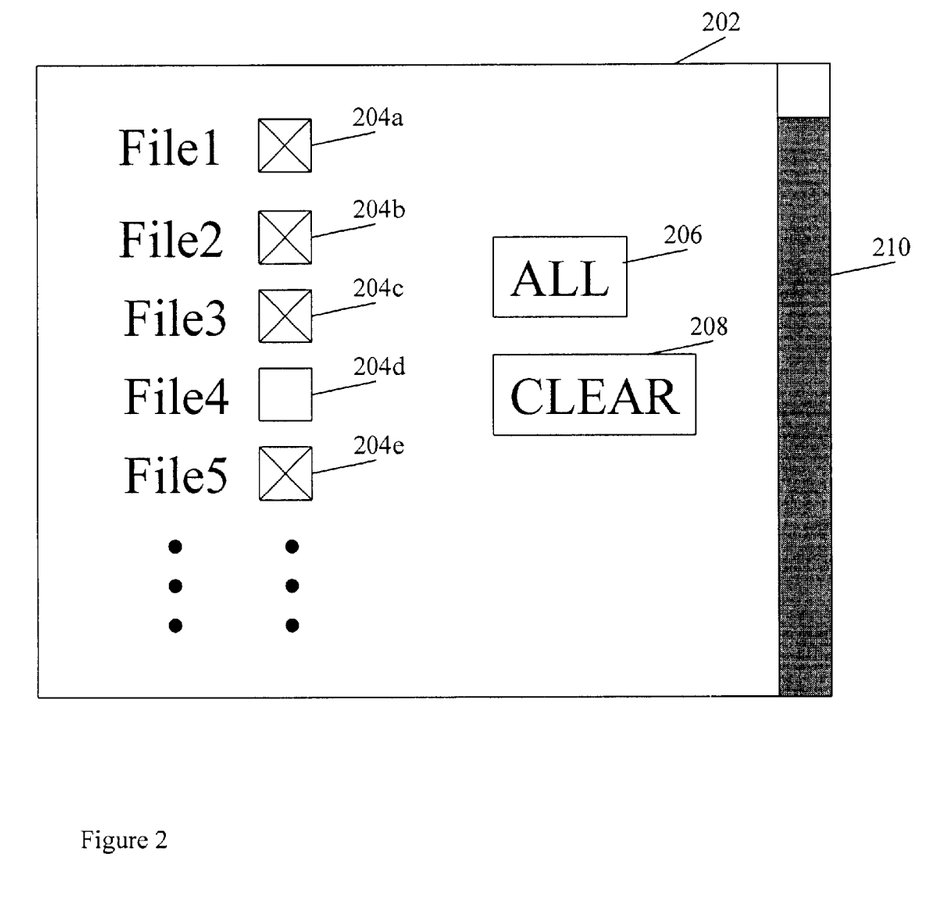
FIG. 2 illustrates a configuration file selection window according to a preferred embodiment of the present invention.

FIG. 2 illustrates a configuration file selection window 202 for selecting configuration parameter files to manage. Configuration file selection window 202 is preferably displayed on display device 104. Referring to FIG. 2, check boxes 204a–e are provided adjacent to each file name. A user can choose any file to process by clicking in the check box. Clicking is performed in a well known manner using pointing device 108. It would be apparent to those skilled in the art that the selection of configuration files to process can be performed in numerous ways within the scope and spirit of the present invention. In addition to the check boxes, a user can select all of the configuration files to process by clicking an ALL button 206. Also, a user can clear all of the selections currently made by clicking the CLEAR button 2–8. Clearing any particular selection is performed by clicking the check box a second time, as is well known in the art. A scroll bar 210 is provided to scroll through the list of files when there are too many to fit in configuration file selection window 202. This is especially useful where the window is resizable as in the preferred embodiment of the present invention.

The selection of files can also be through a command line. For example, the user can type "CONFIGURE File1, File2, File3, File5" to select File1, File2, File3, File5 for management. In addition, a user can select all of the files in a particular directory simply by typing the directory name. For example, to select all of the files in the CFG directory, the user can type "CONFIGURE CFG" or simply "CONFIG-URE" from within the CFG directory or "CONFIGURE ROOT:/CFG" from outside the CFG directory. It would be apparent to those skilled in the art that there are many ways to select files and begin configuration file management that fall within the scope and spirit of the present invention.

The selected files are then displayed in a configuration file management window. A configuration file management window according to a preferred embodiment of the present invention is management window 302 illustrated in FIG. 3. Management window 302 includes a status bar 304 in which the directory or directories in which the files are located is displayed. Management window 302 also has a configuration file window 306. Configuration file window 306 preferably shows the selected configuration files by tabs 307a–d, with one tab corresponding to each configuration file. As illustrated in FIG. 2, configuration files File1, File2, File3 and File5 were selected. Consequently, four tabs, 307a–307d, are shown. Tab 307a corresponds to configuration file File1. Tab 307b corresponds to configuration File2. Tab 307c corresponds to configuration File3. Tab 307d corresponds to configuration file File5.

Figure 3:
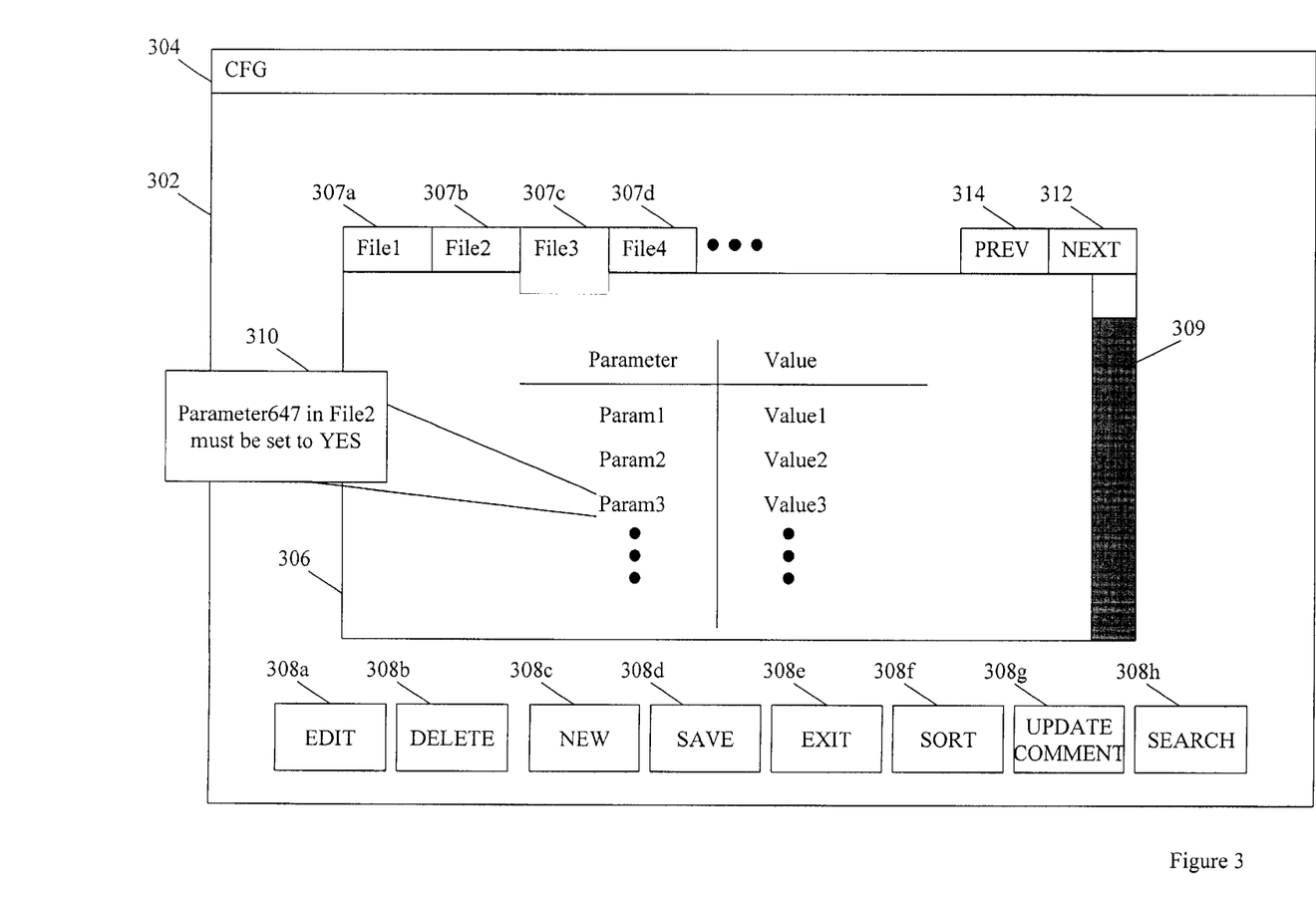
FIG. 3 illustrates a configuration file management window according to a preferred embodiment of the present invention.

To display the parameter-value pairs of a particular configuration file, a user clicks on the tab corresponding to that file. In the example illustrated in FIG. 5, a user clicked on tab 307c. A user can switch between configuration files to manage by clicking on the appropriate tabs corresponding to the desired configuration file.

Upon clicking on tab 307c, the contents of File3 are brought to the front of configuration file window 306. The contents of the file, that is, the parameter-value pairs, are listed, preferably as shown in FIG. 3. A scroll bar 309 is provided to scroll through the parameter-value pairs when there are too many such pairs to fit in configuration file window 306.

In the preferred embodiment of the present invention, management window 302 includes management buttons 308a–h. Management buttons 308a–h provide various configuration file management functions.

Management button 308a is an EDIT button that, when selected, provides an editing function. According to the preferred embodiment of the present invention, EDIT button 308a is used to change the value associated with a particular parameter. To edit a value, the user highlights the parameter-value pair having the value to be edited using pointing device 108 and clicking once. With the parameter and associated value highlighted, the user positions a cursor over EDIT button 308a and clicks once. This causes the a text edit window to appear in place of the highlighted value. Initially, the text edit window contains the old value associated with the parameter. The user then makes the desired change and presses return or enter to save the changed value. In the preferred embodiment of the present invention, the parameter name cannot be changed using EDIT button 308a. However, the parameter name can be changed in a manner analogous to that described above for the value in alternative embodiments of the present invention.

Management button 308b is a DELETE button. It is used to delete parameter-value pairs from a configuration file. To use DELETE button 308b, the user highlights the parameter-value pair to be deleted using pointing device 108 and clicking once. With the parameter-value pair to be deleted highlighted, the user selects DELETE button 308b using pointing device 108. Preferably, the user is asked to verify that he or she wants to delete the highlighted parameter-value pair. Upon verification, the parameter-value pair is deleted from configuration file window 306, and the configuration file.

Management button 308c is a NEW button. NEW button 308c is used to add parameter-value pairs to a configuration file. To use NEW button 308b, the user highlights the parameter-value pair over which the new parameter-value pair is to be added. With the parameter-value pair to be deleted highlighted, the user selects the NEW button 308c using pointing device 108. A text window is placed above the parameter name of the highlighted parameter-value pair into which the user types the new parameter name. Another text window is placed above the value of the highlighted parameter-pair into which the user enters the new value.

Figure 5:
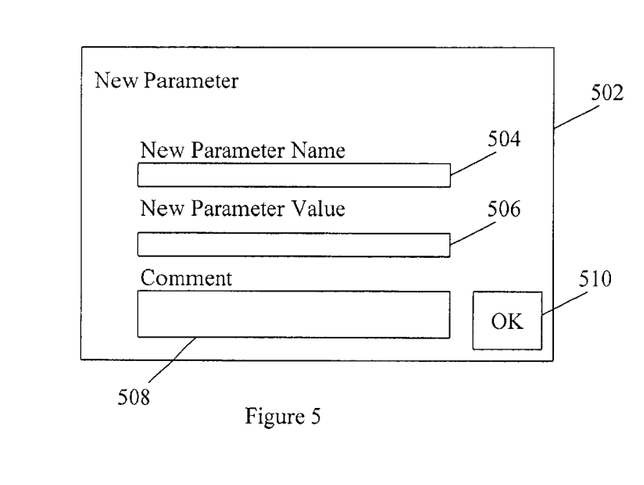
FIG. 5 illustrates a window for entering a new parameter according to an alternative preferred embodiment of the present invention.

In an alternative embodiment of the present invention, a pop-up screen is used to enter the new parameter. Referring to FIG. 5, when NEW button 308c is selected as described above, a pop-up window 502 is displayed to the user. The user then enters the new parameter name in text edit window 504, the new parameter value in text edit window 506 and any comments for the new parameter-value pair in text edit window 508. The user then clicks OK button 510 and the new parameter-value pair is placed in configuration file window 306 over the highlighted parameter-value pair.

As described above, in the preferred embodiment of the present invention, a parameter name cannot be edited. However, the same effect can be achieved using DELETE button 308b to delete the old parameter name, and then adding the edited parameter name and value using NEW button 308c.

Management button 308d is SAVE button. SAVE button 308d is used to save the configuration file after it has been modified. In the preferred embodiment, selecting SAVE button 308d by, for example, using pointing device 108, causes the file to be saved.

Figure 6:
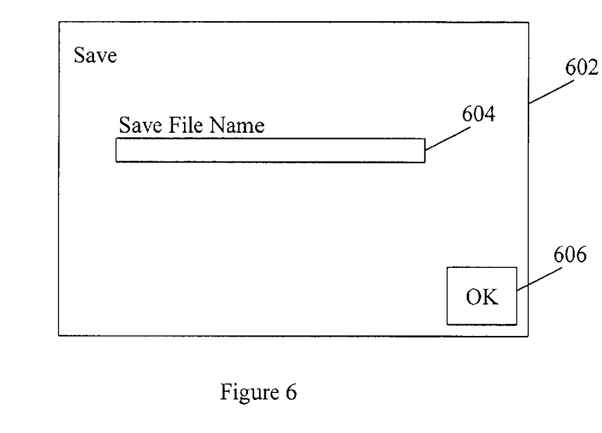
FIG. 6 illustrates a save window according to an alternative preferred embodiment of the present invention.

In an alternative preferred embodiment of the present invention, selecting SAVE button 308d causes a save window to pop up which allows the user to select a new filename for saving the configuration file. Referring to FIG. 6, a save window 602 is illustrated. Save window 602 includes text edit window 604 into which a new file name for saving the configuration file can be entered. When save window 602 first pops up, it displays the name of the original configuration file, in this example, File3. The user can change this name or not. Regardless, to save the file, the user selects an OK button 606.

Management button 308e is an EXIT button. EXIT button is selected to exit the configuration file management tool of the present invention. When the user is finished a particular configuration management session, the user selects EXIT button 308e by, for example, using pointing device 108. The configuration file management tool of the present invention is shut down when EXIT button 308e is selected. In the preferred embodiment of the present invention, the user is asked whether he or she wants to save any configuration files that have been modified but not saved prior to selecting EXIT button 308e.

Management button 308f is a SORT button that is used to sort the parameter-value pairs in configuration window 306 by various criteria. In the preferred embodiment, the criteria are alphabetical by parameter name and numerical by value. To sort the parameter-value pairs, a user selects SORT button 308f using pointing device 108. A sort screen pops up and the user selects which sorting criteria he or she intends to use.

Figure 7:
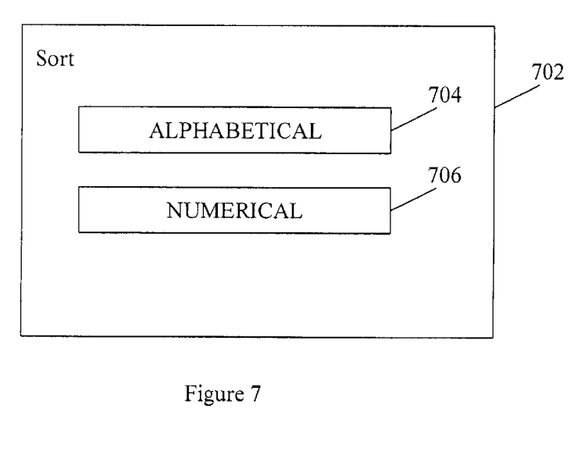
FIG. 7 illustrates a sort window according to a preferred embodiment of the present invention.

Referring to FIG. 7, a sort window 702 according to the preferred embodiment of the present invention is shown. Sort window 702 includes an ALPHABETICAL button 704 and a NUMERICAL button 706. The user selects ALPHA-BETICAL button 704, preferably using pointing device 108, to have the parameter-value pairs sorted and displayed by parameter name. The user selects NUMERICAL button 706, preferably using pointing device 108, to have the parameter-value pairs sorted and displayed by value.

It should be noted that sometimes not all values in a particular configuration file need be numerical. In that case, preferably, the parameter-value pairs having numerical values are sorted in numerical order and the parameter-value pairs having alphanumeric values are sorted by string value and listed in that order after the parameter-value pairs that were sorted numerically.

Management button 308h is a SEARCH button that a user selects to search for a particular parameter-value pair. When SEARCH button 308h is selected, preferably using pointing device 308h, a search window pops up to the user. The search window requests various information that the user can search on, as well as the scope of the search.

Figure 4A:
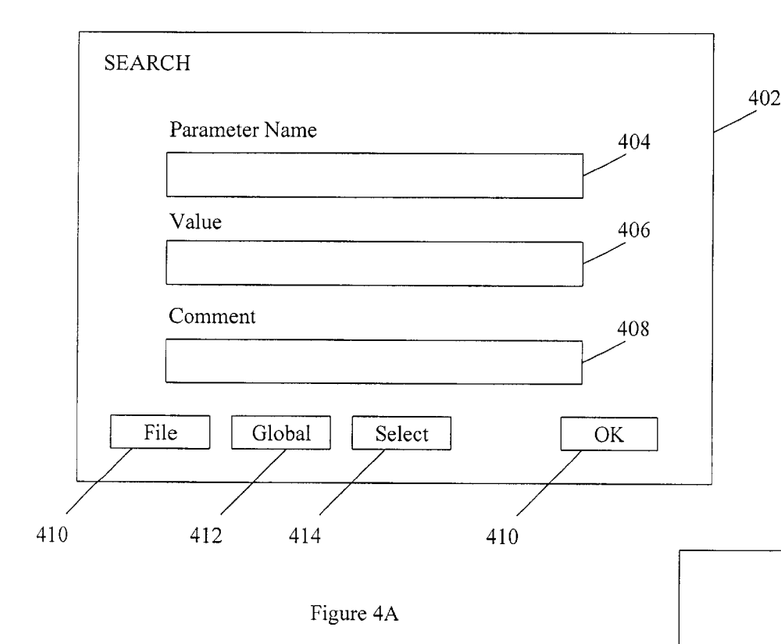
FIG. 4A illustrates a search window according to a preferred embodiment of the present invention.

Referring to FIG. 4A, an exemplary search window 402 according to a preferred embodiment of the present invention is illustrated. Search window 402 preferably contains a text edit window 404 for inputting text to search for in the parameter name. Search window 402 also preferably contains a text edit window 406 for inputting text to search for in the value. Search window 402 preferably contains a text edit window 408 for inputting text to search for in any comment associated with parameter-value pairs. Information may be entered in one or more than one of text edit windows 404, 406 and 408. In addition, well known wild characters, including "*" and "?" can be used in the search. It would be apparent to those skilled in the art that any search engine technology can be used. After the user has input the search criteria and selected a scope of the search, the user selects an OK button 416 to perform the search.

Search window 402 also includes a FILE button 410. Selecting FILE button 410 indicates that the search is limited to the current configuration file whose contents are shown in configuration file window 306. Search window 402 also includes a GLOBAL button 412. Selecting GLOBAL button 412 indicates that the search should look through all known configuration files in the system. Search window 402 also includes a SELECT button 414. Selecting SELECT button 414 indicates pops up a select window similar to that shown in and described with respect to FIG. 2. Using the popped up select window, the user selects the files that the search will be limited to.

Figure 4B:
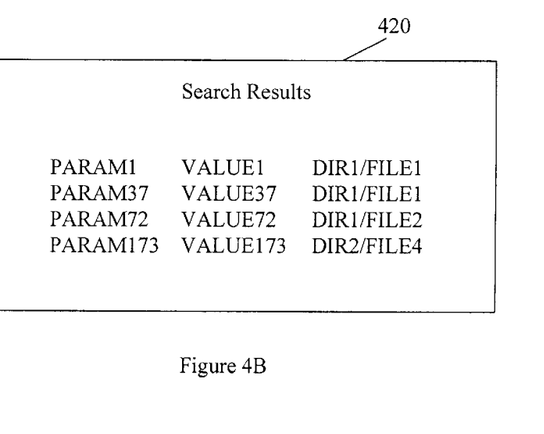
FIG. 4B illustrates a search results window according to a preferred embodiment of the present invention.

If one or more parameter-value pairs are found meeting the search criteria, they are displayed preferably in a separate pop up window. Referring to FIG. 4B, such a separate search result pop up window 420 is illustrated. Preferably, the found parameter-value pairs are listed as well as the file and directory in which they are located.

Comments can be stored for any parameter-value pair. The comment can have any desired information for the parameter-value pair, including for example, permissible range of the parameter, tips for the using the parameter and dependencies on other parameters. Comments can include other narrative information. For example, a comment can include historical information regarding the value of the parameter, for example, the past values of the parameter. In the preferred embodiment of the present invention, comments are displayed when a parameter name is selected using pointing device 108.

A comment screen can pop up whenever a parameter-value pair is selected, for example, via highlighting using pointing device 108. For example, a comment window 310 pops up when PARAM3 in File 2 is selected, and informs the user that PARAM647 must be set to yes. This illustrates an example of using comments to show interdependency of parameters, even those in other configuration files, upon one another. In an alternative preferred embodiment, comments pop up when the parameter name or the value of the parameter-value pair is double-clicked using pointing device 108.

Figure 8:
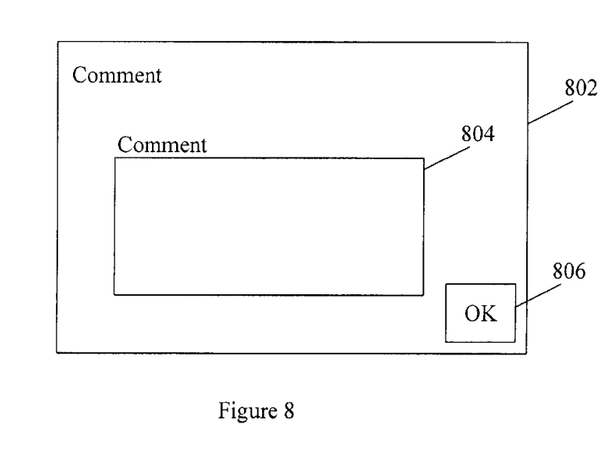
FIG. 8 illustrates a comment window according to a preferred embodiment of the present invention.

Comments are updated by highlighting a particular parameter and clicking UPDATE COMMENT button 308g. When UPDATE COMMENT button 308g is clicked a pop-up window 802 appears on display screen 104. Pop-up window 802 includes a text window 804 into which the user enters the text of the comment. If there is already a comment for the parameter, the text of the comment appears in text window 804. The user can edit the text of the comment as desired. When the user has finished editing or entering the comment, the user clicks an OK button 806 and the comment is saved so that it corresponds to the parameter-value pair. Note that UPDATE button 308g can be used to save a new comment for a particular parameter-value key pair.

Due to screen size limitation, only P tabs are shown to the user. In the preferred embodiment of the present invention P is 12. If more than P files are selected NEXT button 312 and PREV button 314 are shown to the user. The user selects NEXT button 312, using pointing device 108, to see the next P tabs. The user selects PREV button 314, using pointing device 108, to see the pervious P tabs. If there are no more tabs because the user has reached the last set of P (or less than P) tabs, NEXT button 312 is inactivated. If there are no previous tabs because the user has reached the first set of P tabs, PREV button 314 is inactivated. Preferably, the buttons are inactivated by graying them out.

In an alternative preferred embodiment of the present invention, the configuration files are selected from multiple directories. In this case, the multiple directory names are displayed in status bar 304. In a preferred embodiment, the names of each directory and each file associated with that directory are displayed with unique colors.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for managing a plurality of configuration parameters, each configuration parameter having an associated value, stored in a plurality of configuration files as configuration parameter-value pairs, each of the configuration files associated with a file name, comprising:

a computer having one or more disks on which the plurality of configuration parameters is stored in the plurality of configuration files;

a display device coupled to the computer; and a configuration file management window in which is displayed the file name associated with each configuration file corresponding to at least a subset of the configuration files in the plurality of configuration files and the configuration parameters and associated values stored as configuration parameter-value pairs stored in the each of the configuration files in the subset, and a comment screen for displaying a comment that is associated with the configuration parameter-value pair, and wherein the comment screen having a parameter-value pair comment is displayed when a configuration parameter-value pair is selected.

2. The system of claim 1, further comprising a selection window in which a user can select the subset of files to be displayed in the configuration file management window.

3. The system of claim 1, wherein the plurality of configuration files is located in a single computer directory.

4. The system of claim 1, wherein all of the configuration files are displayed in the configuration file management window.

5. The system of claim 1, wherein the configuration file management window comprises an edit button that is used for editing configuration file parameters.

6. The system of claim 1, wherein the subset comprises more than one of the plurality of configuration file.

7. The system of claim 6, further comprising a delete button for deleting a configuration parameter-value pair from the one of the plurality of configuration files in which it is stored.

8. The system of claim 1, further comprising a new button for adding a configuration parameter and associated value as a configuration parameter-value pair to one of the plurality of configuration files.

9. The system of claim 1, further comprising a save button for saving a configuration file after modification.

10. The system of claim 9, further comprising a save window that allows a user to change the name of the configuration file to be saved after modification.

11. The system of claim 1, further comprising a sort window to sort the configuration parameters displayed in the configuration management window.

12. The system of claim 11, further comprising means for sorting the configuration parameters names alphabetically.

13. The system of claim 11, further comprising means for sorting the values associated with the configuration parameters numerically.

14. The system of claim 1, further comprising:

a search button for performing a search of the plurality of configuration parameters according to one or more search criteria; and a search results window for displaying a list of any configuration parameter-value pairs that meet the search criteria.

15. The system of claim 14, wherein the search is limited to a file.

16. The system of claim 14, wherein the search checks all configuration files.

17. The system of claim 14, wherein the search is limited to one or more selected configuration files.

18. The method of claim 14, further comprising the steps of:

selecting a plurality of configuration files in which to search; and searching only in the selected configuration files.

19. The system of claim 1, wherein the comment describes a relationship between one or more parameters.

20. A system for managing a plurality of configuration parameters, each configuration parameter having an associated value, stored in a plurality of configuration files as configuration parameter-value pairs, each of the configuration files associated with a file name, comprising:

a computer having one or more disks on which the plurality of configuration parameters is stored in the plurality of configuration files;

a display device coupled to the computer; and a configuration file management window in which is displayed the file name associated with each configuration file corresponding to at least a subset of the configuration files in the plurality of configuration files and the configuration parameters and associated values stored as configuration parameter-value pairs stored in the each of the configuration files in the subset, and a comment screen for displaying a comment that is associated with the configuration parameter-value pair, and wherein the configuration file management window comprises a comment edit button that is used to edit the comment.

21. The system of claim 20, further comprising a selection window in which a user can select the subset of files to be displayed in the configuration file management window.

22. The system of claim 20, wherein the plurality of configuration files is located in a single computer directory.

23. The system of claim 20, wherein all of the configuration files are displayed in the configuration file management window.

24. The system of claim 20, further comprising a delete button for deleting a configuration parameter-value pair from the one of the plurality of configuration files in which it is stored.

25. The system of claim 20, further comprising a new button for adding a configuration parameter and associated value as a configuration parameter-value pair to one of the plurality of configuration files.

26. The system of claim 20, further comprising a save button for saving a configuration file after modification.

27. The system of claim 20, further comprising a sort window to sort the configuration parameters displayed in the configuration management window.

28. The system of claim 20, further comprising:

a search button for performing a search of the plurality of configuration parameters according to one or more search criteria; and a search results window for displaying a list of any configuration parameter-value pairs that meet the search criteria.

29. The system of claim 20, wherein the comment screen having a parameter-value pair comment is displayed when a configuration parameter-value pair is selected.

30. The system of claim 20, further comprising a selection window in which a user can select the subset of files to be displayed in the configuration file management window.

31. A system for managing a plurality of configuration parameters, each configuration parameter having an associated value, stored in a plurality of configuration files as configuration parameter-value pairs, each of the configuration files associated with a file name, comprising:

a computer having one or more disks on which the plurality of configuration parameters is stored in the plurality of configuration files;

a display device coupled to the computer;

a configuration file management window in which is displayed the file name associated with each configuration file corresponding to at least a subset of the configuration files in the plurality of configuration files and the configuration parameters and associated values stored as configuration parameter-value pairs stored in the each of the configuration files in the subset, and a comment screen for displaying a comment that is associated with the configuration parameter-value pair; and an update window to update the comment.

32. The system of claim 31, wherein all of the configuration files are displayed in the configuration file management window.

33. The system of claim 31, wherein the configuration file management window comprises an edit button that is used for editing configuration file parameters.

34. The system of claim 31, further comprising a delete button for deleting a configuration parameter-value pair from the one of the plurality of configuration files in which it is stored.

35. The system of claim 31, further comprising a new button for adding a configuration parameter and associated value as a configuration parameter-value pair to one of the plurality of configuration files.

36. The system of claim 31, further comprising a sort window to sort the configuration parameters displayed in the configuration management window.

37. The system of claim 31, further comprising:

a search button for performing a search of the plurality of configuration parameters according to one or more search criteria; and a search results window for displaying a list of any configuration parameter-value pairs that meet the search criteria.

38. The system of claim 31, wherein the comment screen having a parameter-value pair comment is displayed when a configuration parameter-value pair is selected.

39. A method for managing a plurality of configuration parameters stored on a computer disk coupled to a computer in a plurality of configuration files having a plurality of configuration parameter-value pairs stored therein, comprising the steps of:

displaying a configuration file name corresponding to one or more of the plurality of configuration files in a selection window;

selecting one or more of the configuration file names from the selection window for display in selectable tabs of a configuration management window on a display device coupled to the computer;

selecting a configuration file for display in the configuration management window using the selectable tabs;

displaying one or more configuration parameters and corresponding values stored in the selected configuration file in the configuration management window; and editing one or more of the comments corresponding to a parameter-value pair.

40. The method of claim 39, wherein the selection step comprises the step of selecting configuration files from only a single directory.

41. The method of claim 39, wherein the selecting step comprises the step of selecting all of the configuration files for display in the configuration file management window.

42. The method of claim 39, further comprising the step of editing the configuration file parameters displayed in the configuration file management window.

43. The method of claim 42, further comprising the step of editing only configuration parameter values.

44. The method of claim 39, further comprising the step of deleting a configuration parameter-value pair from the one of the plurality of configuration files in which it is stored.

45. The method of claim 39, further comprising the step of adding a configuration and associated value as a configuration parameter-value pair to one of the plurality of configuration files.

46. The method of claim 39, further comprising the step of saving a configuration file after modification.

47. The method of claim 46, further comprising the step of saving a configuration file after modification as a new file name.

48. The method of claim 39, further comprising the step of sorting the configuration parameters displayed in the configuration file management window.

49. The method of claim 48, further comprising the step of sorting the configuration parameter names alphabetically.

50. The method of claim 48, further comprising the step of sorting the values of the configuration parameter-value pairs numerically.

51. The method of claim 39, further comprising the steps of:

performing a search of the plurality of configuration parameters according to one or more search criteria; and displaying a list of any configuration parameter-value pairs that meet the search criteria.

52. The method of claim 51, further comprising the step of only searching one configuration file.

53. The method of claim 51, further comprising the step of searching all configuration files.

54. The method of claim 39, wherein at least one of the comments describes a relationship between one or more parameters.

55. The method of claim 39, further comprising displaying one or more comments associated with a configuration parameter-value pair.

* * * * *